United States Patent [19]

Prinsze

[11] 4,398,139
[45] Aug. 9, 1983

[54] RECHARGEABLE FLASHLIGHT COMBINED WITH A CONSTANT CURRENT BATTERY CHARGING CIRCUIT

[76] Inventor: Onno M. Prinsze, 4528 N. Pima Rd., Scottsdale, Ariz. 85261

[21] Appl. No.: 236,971

[22] Filed: Feb. 23, 1981

Related U.S. Application Data

[63] Continuation-in-part of Ser. No. 964,944, Nov. 30, 1978, abandoned.

[51] Int. Cl.³ .............................................. H02J 7/02
[52] U.S. Cl. ........................................ 320/2; 320/48; 362/183
[58] Field of Search .................. 320/2, 3, 10, 17, 39, 320/48; 362/183; 323/273

[56] References Cited

U.S. PATENT DOCUMENTS

| | | | |
|---|---|---|---|
| 3,445,745 | 5/1969 | Frezzolini | 320/40 X |
| 3,521,050 | 7/1970 | Shagena | 362/183 |
| 3,534,354 | 10/1970 | Galginaitis | 320/48 X |
| 3,749,905 | 7/1973 | Friedman et al. | 320/3 |
| 3,890,555 | 6/1975 | Nelson et al. | 320/2 |
| 3,987,354 | 10/1976 | Mason | 320/39 |
| 4,109,193 | 8/1978 | Schultheis | 320/2 |
| 4,147,969 | 4/1979 | Miller et al. | 320/2 |

OTHER PUBLICATIONS

Electronic Design 8, vol. 25, pp. 118–122, Apr. 12, 1977.

Primary Examiner—William H. Beha, Jr.
Attorney, Agent, or Firm—H. Gordon Shields

[57] ABSTRACT

Apparatus for charging rechargeable batteries includes a constant current regulator connected in combination with a current limiting resistor to provide constant current for charging the rechargeable battery and a pair of light emitting diodes are used to indicate the charging status of the rechargeable battery.

1 Claim, 3 Drawing Figures

RECHARGEABLE FLASHLIGHT COMBINED WITH A CONSTANT CURRENT BATTERY CHARGING CIRCUIT

CROSS-REFERENCE TO RELATED APPLICATION

This is a continuation-in-part application of copending application Ser. No. 964,944, filed Nov. 30, 1978, and now abandoned.

BACKGROUND OF THE INVENTION

1. Field of the Invention

This invention relates to the charging of rechargeable batteries, and, more particularly, to the recharging of rechargeable batteries using constant current regardless of the number of cells in the battery.

2. Description of the Prior Art

Broadly defined, there are two common situations where rechargeable batteries are used, in vehicles, such as cars, and in household use, such as flashlights and radios. The charging of a battery is typically accomplished either through a vehicle power system or through a transformer from household line current which is transformed and rectified to the proper voltage for the recharging of the battery. A visual indication, usually by filament lamp or light-emitting diode (L.E.D.), that charging is in progress, may be provided for the convenience of the user.

An example of the prior art is shown in U.S. Pat. No. 4,092,580, in which a rechargeable flashlight battery system is incorporated into an automotive electrical system. A pair of lamps are used to indicate whether the charging circuit is in a high or a low status. The high or the low status is selectively engaged by the user of the apparatus. If neither of the lamps is lighted, no charging is being accomplished. The lamps act as current limiters for charging purposes.

U.S. Pat. No. 3,829,676 also describes a rechargeable flashlight for use in a vehicle. Again, however, no provision is made in the circuitry apparatus of this patent to provide by visible means the status of the charging or location of the system during a power interruption. Moreover, with respect to the '580 patent and the '676 patent, the charging current is not constant under all charging circumstances.

U.S. Pat. No. 3,890,555 describes a charging system based on constant voltage rather than constant current principles. This permits charging of only a fixed number of cells, and it requires switching transistors in combination with a diode.

SUMMARY OF THE INVENTION

The invention described and claimed herein comprises a battery charger operating with a constant current which, within narrow limits, is independent from voltage variations of the power source and which remains constant regardless of the number of battery cells being charged. A pair of light-emitting diodes which, without any semiconductor device other than the L.E.D.'s themselves, indicate the status of charging or power failure, respectively.

Among the objects of the present invention are the following:

To provide new and useful electrical circuitry apparatus for charging recharageable batteries;

To provide new and useful apparatus for charging rechargeable batteries;

To provide constant current apparatus for recharging batteries regardless of power voltage fluctuations and the number of cells in the charging circuit;

To provide a safe current level for the charging of battery cells to render a short circuit harmless;

To provide new and economical apparatus for visually indicating the charging and power failure status of rechargeable batteries;

To provide new and useful apparatus for recharging batteries using a constant recharging current; and To provide new and useful electrical circuitry apparatus including a pair of light emitting diodes for indicating the charging status of rechargeable batteries by utilizing the characteristics of the LED's themselves and without the use of any other semiconductor device.

DESCRIPTION OF THE PREFERRED EMBODIMENT

Figure 1:
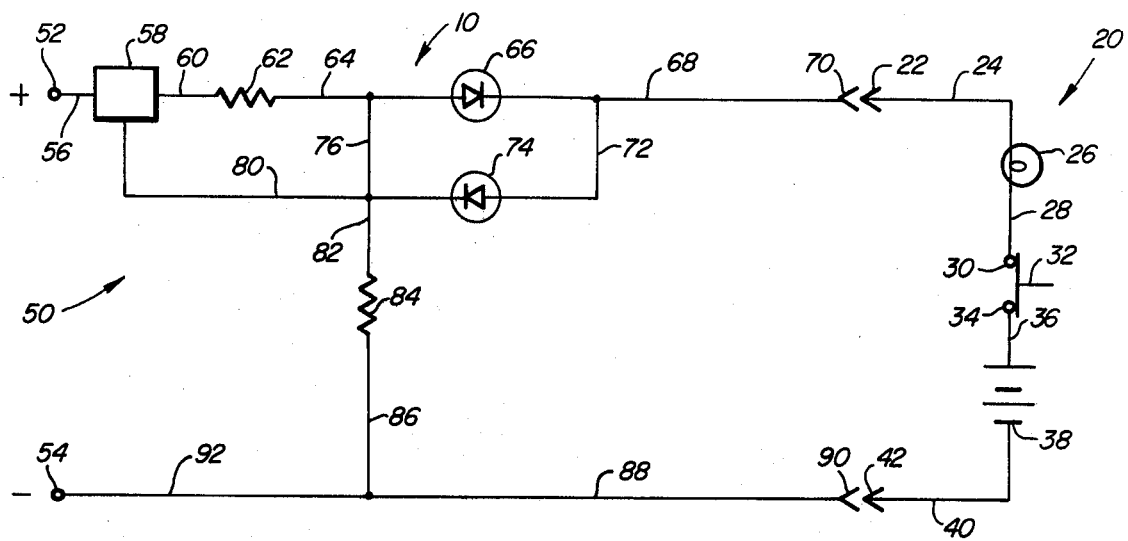
FIG. 1 is a schematic circuit diagram of apparatus of the present invention.

FIG. 1 comprises a schematic circuit diagram of battery charging apparatus 10 embodying the present invention. The battery charging apparatus 10 includes two portions, a flashlight portion 20 and a charging circuitry portion 50. The flashlight portion 20 includes a terminal 22 and a conductor 24 extending from the terminal 22 to one side of a bulb or lamp 26. The bulb or lamp 26 is in turn connected to another terminal 30 by another conductor 28. The terminal 30 is connected to a terminal 34 by a switch 32. From terminal 34, a conductor 36 extends to one side of a rechargeable flashlight battery 38, which may comprise a plurality of cells. Another conductor 40 extends from the other side of the rechargeable battery 38 to a terminal 42. The terminals 22 and 42 in turn connect with respective mating terminals 70 and 90 in the recharging circuitry 50.

The switch 32 is the normal "on-off" switch of a flashlight, and the bulb 26 is the normal bulb or lamp of an ordinary flashlight. Similarly, the battery 38 is a battery of an ordinary flashlight, with exception that the term "ordinary", with respect to the flashlight apparatus 20, indicates that the battery 38 is rechargeable in a conventional flashlight. The switch 32 must be closed, as shown in FIG. 1, across the terminals 30 and 34, to allow the battery 38 to be charged. If the switch 32 is open, no charging of the battery 38 will take place. Special electronic apparatus (not shown) may be utilized to bypass the switch during the charging mode, if desired, without altering the concept of the present invention.

The flashlight apparatus 20 accordingly includes two internal terminals 30 and 34, and two external terminals 22 and 42, which must be connected to the battery charging circuitry apparatus 50 in order to provide for the charging of the battery 38.

The recharging circuitry 50 includes a pair of terminals 52 and 54 which are respectively designated as the positive and negative input terminals of the charging circuitry apparatus. The terminals 52 and 54 are secured to a dc power source of proper voltage, such as the electrical system of an automobile. Preferably, the terminals 52 and 54 are not connected to (or through) the ignition switch of the automobile, but rather are "hot" at all times. This hot wire arrangement provides that the flashlight battery 38, when the flashlight apparatus 20 is connected to the recharging circuitry 50, may be recharging regardless of whether the vehicle in which the apparatus 10 is installed is in use, with the ignition switch "on", or whether the vehicle is merely waiting for use, with the ignition switch "off".

A conductor 56 extends from the terminal 52 to a voltage regulator 58. The voltage regulator 58 is a relatively common integrated circuit voltage regulator that is connected in the circuitry apparatus 50 as a current regulator. The conductor 56 extends to the input terminal of the voltage regulator 58 from the positive terminal 52. A conductor 60 extends from the output terminal of the voltage regulator 58 to one side of a resistor 62 which determines the current value in the circuit. The IC 58 and the resistor 62 accordingly comprise the current regulator apparatus which provides a substantially constant current. This is so because the voltage regulator IC 58 provides substantially constant voltage across the fixed resistor 62 and consequently a substantially constant charging current is provided according to Ohm's law. A conductor 64 extends from the other side of the resistor 62 to the anode of a light-emitting diode 66. The cathode of a light-emitting diode 66 is connected to one end of a conductor 68 and also to one end of a conductor 72. The opposite end of the conductor 68 is in turn connected to the terminal 70. The terminal 70 mates with the terminal 22 of the flashlight 20 to connect one side of the battery 38 of the flashlight apparatus 20 to the charging circuitry 50.

The conductor 72 extends from the juncture of the conductor 68 and the cathode of the light emitting diode 66 to the anode of a second light emitting diode 74. The cathode of the light emitting diode 74 is in turn connected to the juncture of three conductors, including a conductor 76, a conductor 80, and a conductor 82. The conductor 76 extends from the juncture of conductor 64 and the anode of the light emitting diode 66 to the cathode of the light emitting diode 74. The conductor 80 extends to the voltage regulator 58. The conductor 82 extends from the tie point of the cathode of diode 74, the conductor 76, and the conductor 80 to one side of a load resistor 84. The other side of the load resistor 84 is connected to a conductor 86 which extends to the juncture of a pair of conductors 88 and 92. One end of the conductor 88 extends to the terminal 90, and the conductor 92 extends to the terminal 54. The terminal 90 mates with the terminal 42 of the flashlight portion 20 of the battery charging apparatus 10 to complete the circuitry which provides for recharging of the battery 38.

The conductor 76 connects the anode of the diode 66 and the cathode of the diode 74, while the conductor 72 connects the cathode of diode 66 with the anode of the diode 74. The conductor 80 connects the tie points of the resistor 62 and the anode of diode 66 with the voltage regulator 58 for voltage feedback purposes to control the voltage output of the regulator 58.

The resistor 84 acts as a load in the charging circuitry 50. The sole purpose of resistor 84 is as a load for the secondary circuit when no charging of the flashlight battery 38 is taking place due to a power failure of the dc voltage source at the terminals 52 and 54. With the switch 32 closed (on), and a power interruption at the terminals 52 and 54, the flashlight battery 38 becomes the power source for the secondary circuit which includes the L.E.D. 74 and the resistor 84. L.E.D. 66, of course, blocks current flow from the battery 38, which forces the current to flow through L.E.D. 74.

The current determining resistor 62 is in combination with the voltage regulator 58 and the feedback loop of conductors 76 and 80 to provide a constant charging current for the recharging of the battery 38 when the battery switch 32 is closed (on). The substantially constant current is provided regardless of the number of cells in the battery.

While the battery 38 is charging, the light-emitting diode 66 will glow to indicate that charging of the battery is being accomplished. For convenience the L.E.D. is selected to glow red. The diode 74 may typically be a diode which will glow with a green color when no charging is being accomplished when the flashlight 20 is connected to the charging circuitry 50 and when the flashlight switch 32 is on. Since it is rather typical for pilot lights in various circuits to be colored red and to be "on" when the circuits are operating, that same color philosophy is used herein. The red diode 66 simply indicates that the charging circuitry is "on" and operating. In case of a power interruption in the charging circuitry, the red diode 66 will turn off and the green diode 74 will turn on, thus indicating the location of the flashlight and indicating further that the flashlight is available for use. Obviously, however, neither the red diode 66 nor the green diode 74 indicates the extent of the charge or condition of the battery 38.

It may be seen that two separate current paths are established by the battery charging apparatus 10. One path extends from the terminal 52, through the voltage regulator 50, the current determining resistor 62, the diode 66, the terminals 70 and 22, the flashlight bulb 26, switch 32, battery 38, the terminals 42 and 90, and the terminal 54. A second current path is through the flashlight 20, the diode 74, the load resistor 84, and the conductor 88 to complete the circuitry through the flashlight 20. The load resistor 84 will control the current drain from the battery 38 during a power interruption.

The first current path is for charging purposes. It will be noted that with the voltage regulator 58 in combination with the resistor 62, a constant current is provided. A direct short circuit across the terminals 70 and 90 will not result in any damage to the apparatus because only the amount of current initially determined, or predetermined in accordance with the selection of the voltage output of the voltage regulator 58 and the value of the resistor 62, will flow in the circuit.

With the flashlight 20 removed from the charging circuitry, or with the flashlight connected to the charging circuitry, but with switch 32 open ("off"), both diodes 66 and 74 will be off and will not glow.

Figure 2:
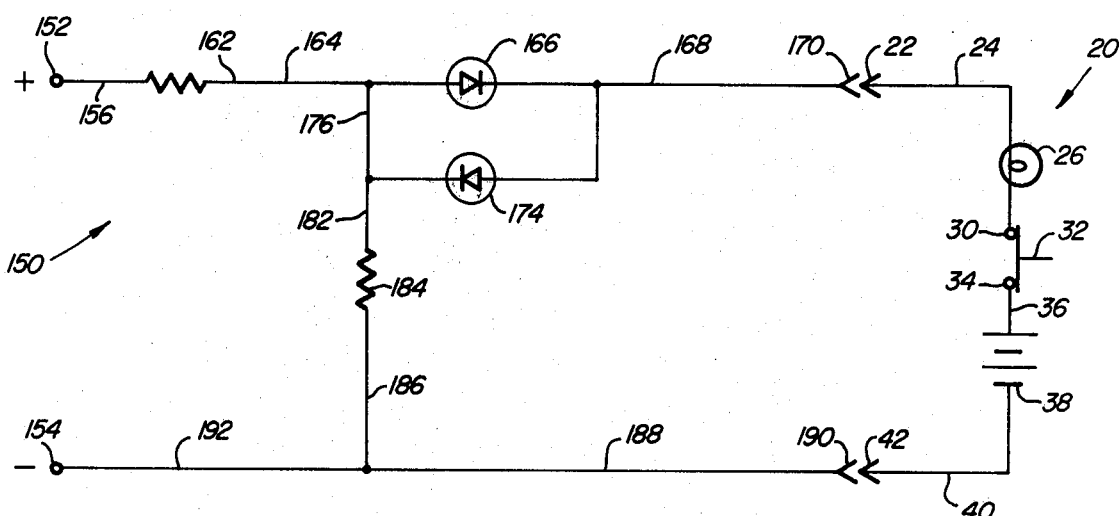
FIG. 2 is a schematic circuit diagram of an alternate embodiment of the apparatus of FIG. 1.

FIG. 2 comprises a schematic circuit diagram of an alternate embodiment of the apparatus of FIG. 1. It comprises a schematic circuit diagram without a voltage regulator, but using only the input voltage of the terminals 152 and 154 and a fixed resistor 162 to provide a limited charging current, and with substantially the same status indicating circuitry as that illustrated in FIG. 1. The flashlight apparatus 20 of FIG. 1 is shown connected to recharging circuitry 150 which includes a positive terminal 152 to which is connected one end of a conductor 156. The other end of the conductor 156 is connected to one end of a current limiting resistor 162. The other end of the resistor 162 is connected to one end of a conductor 164. The conductor 164 extends to the juncture of the anode of a light-emitting diode 166 and a conductor 176. The cathode of the light emitting diode 166 is connected to one end of a conductor 168 and to the anode of a light-emitting diode 174. The other end of the conductor 168 is connected to a terminal 170 which mates with the terminal 22 of the flashlight apparatus 20.

The cathode of the light emitting diode 174 is connected to the other end of the conductor 176 and to one end of a conductor 182. The other end of the conductor 182 extends to one end of a load resistor 184. The other end of the load resistor 184 is connected to one end of a conductor 186. The opposite end of the conductor 186 is tied to the juncture of a pair of conductors 188 and 192. The conductor 188 extends from the juncture of the conductors 186 and 192 to a terminal 190 which mates with the terminal 42 of the flashlight 20. The conductor 192 in turn extends to a circuit ground terminal 154.

It will be seen that the circuitry of FIG. 2 is substantially the same as the circuitry of FIG. 1, with the exception that a voltage regulator is not provided and accordingly the charging current for the battery 38 of the flashlight 20 will vary due to a variation of power supply voltage and also due as a consequence of the number of cells comprising the flashlight battery. The charging current for different numbers of cells may vary slightly, but will be substantially constant for any given charging situation. However, the function of the light emitting diodes is the same in both circuits. A dc power is connected to the terminals 152 and 154 to provide the charging current for the apparatus.

Two current paths are again established in the embodiment of FIG. 2, just as in the embodiment of FIG. 1. One current path is through the light-emitting diode 166, which may glow red, substantially the same as the diode 66 of FIG. 1. When L.E.D. 166 glows red, the glow indicates that charging of the battery 38 is being accomplished. However, when the power source of the charging apparatus, between the positive terminal 152 and the ground terminal 154 is interrupted, with the flashlight 20 connected to the charging circuitry 150 and with the switch 32 in the closed position, a second current path through the L.E.D. 714 and load resistor 184 is established. The diode 174 will then glow, substantially the same as L.E.D. 74 of FIG. 1. The flow of the diode 174 indicates that the charging power source has been interrupted. This is substantially the way the two current paths of FIG. 1 operate.

In the embodiments of FIGS. 1 and 2, as long as terminals 52 and 54, and terminals 152 and 154, respectively, are connected to a power source, the red diodes 66 and 166 will glow, indicating that the charging circuit is operating. This assumes, of course, that a flashlight 20 is connected to the circuit in the flashlight. A failure of the power source, with the flashlight switch closed, will set up a second path, using battery 38 as the current source, and with L.E.D. 74 or L.E.D. 174 in the second current path with load resistors 84 or 184, respectively. The green glow of the L.E.D.'s will enable the flashlight 20 to be located in darkness, if a need for such should arise.

Figure 3:
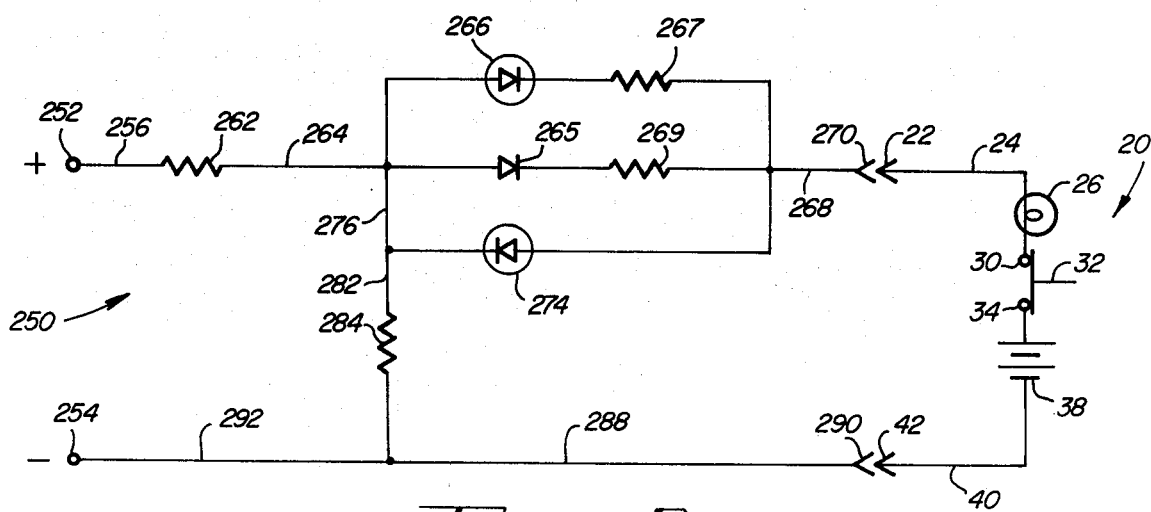
FIG. 3 is a schematic circuit diagram of an alternate embodiment of the apparatus of FIG. 2.

FIG. 3 comprises an alternate embodiment of the apparatus of FIG. 2. The circuitry schematically represented in FIG. 3 includes provision for a diode-resistor network for a charging circuit in which the required charging current is greater than the maximum current permitted through a light-emitting diode. A current source for charging current is connected between a pair of conductors 256 and 264, with the conductor 264 connected to the juncture of three elements. The three elements include the anode of a light-emitting diode 266, the anode of a diode 265, and one end of a conductor 276. The cathode of the light-emitting diode 266 is connected to one end of a resistor 267, and the other end of the resistor 267 is connected to the juncture of three elements, one of which is one end of a conductor 268, which extends to a terminal 270.

The cathode of the diode 265 is connected to one end of a resistor 269, while the other end of the resistor 269 is connected to the juncture of the end of the resistor 267 with the conductor 268, and the same juncture is connected to the anode of another light-emitting diode 274. The cathode of the light-emitting diode 274 is connected to the end of conductor 276 remote from the anodes of the L.E.D. 266 and the diode 265, and from the conductor 264.

A resistor 284, which comprises a load resistor for the secondary circuit which includes the flashlight 20 and the L.E.D. 274, extends from a conductor 282 to the juncture of a pair of conductors 288 and 292. The conductor 288 extends on the one hand to a terminal 290, and the conductor 292 extends on the other hand to the negative or ground terminal 254 of the charging system. The conductor 282 extends from one side of the resistor 284 to the juncture of the conductor 276 and the cathode of the L.E.D. 274. A flashlight, such as flashlight 20 shown in FIGS. 1 and 2, is connected to or across the terminals 270 and 290.

In keeping with the embodiment of FIGS. 1 and 2, L.E.D. 266 preferably glows red when a charging current flows through it, and L.E.D. 274 glows green when no charging current flows and when a secondary current path from the flashlight battery is flowing through the L.E.D. 274.

It is obvious that if the voltage of the battery 38 of the flashlight is equal to or greater than the input or source voltage for the charging current, less the voltage drop through the charging circuitry, charging of the battery 38 will, of course, not occur.

The charging apparatus of FIGS. 1, 2, and 3 provides a substantially constant charging current, limited in accordance with the voltage source. The charging current in the circuitry of FIG. 1 is substantially constant because the voltage regulator 58, generating a constant voltage across fixed resistor 62, will result in a constant current regardless of input voltage fluctuations or number of cells being charged. In the circuitry of FIGS. 2 and 3, a substantially constant charging current flows, but it is dependent on the fluctuations of the voltage source and the number of cells in the battery 38.

In the above description, a dc voltage source of an automobile or automotive vehicle is discussed by way of illustration. However, it is obvious that the same charging circuitry, as shown in FIGS. 1, 2, and 3, can be used regardless of whether ac line voltage, transformed downwardly and rectified, or dc voltage from a vehicle, whether it be an automotive vehicle, a boat, or an aircraft, is used as the energy source for the charging current.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Flashlight charging apparatus, comprising, in combination:

a rechargeable flashlight, including
  a rechargeable battery comprising one or more cells,
  a lamp,
  a switch, having a closed position for connecting the rechargeable battery and the lamp, and having an open position for disconnecting the battery and the lamp, and
  first terminal means for connecting the rechargeable flashlight to a battery charging circuit;

battery charging circuit means, including
  a voltage source for charging the rechargeable battery in the rechargeable flashlight when the switch is in the closed position,
  current means for providing substantially constant current for recharging the rechargeable battery without regard to the number of cells in the battery, including
    voltage means connected to the voltage source, and
    a first resistor combined with the voltage means for providing the substantially constant current to the rechargeable battery,
    a second resistor and a diode connected in series, and
    a third resistor;

a first light emitting diode connected in series with the third resistor of the current means to provide a visual indication that the rechargeable battery is being charged from the voltage source and the current means, said third resistor and first light-emitting diode being in parallel with the second resistor and diode for providing a higher substantially constant current for recharging the rechargeable battery than may flow through the first light-emitting diode; and a second light emitting diode connected to the rechargeable battery to provide visual indication that the rechargeable battery is not being charged from the voltage source and the current means.

* * * * *